United States Patent [19]

Vikhlyaev et al.

[11] 4,308,922

[45] Jan. 5, 1982

[54] IMPACT DEVICE

[76] Inventors: Alexandr A. Vikhlyaev, ulitsa Parkovaya, 16; Georgy M. Nosikov, ulitsa Gopolya, 17, kv. 55; Nikolai I. Semenov, ulitsa Sofiiskaya, 8, kv. 22; Alexandr I. Fedulov, ulitsa Mechurina, 17, kv. 5, all of Novosibirsk, U.S.S.R.

[21] Appl. No.: 922,580

[22] Filed: Jul. 6, 1978

[51] Int. Cl.[3] .............................................. B23Q 5/033

[52] U.S. Cl. .............................................................. 173/18

[58] Field of Search ........................ 173/13, 15, 16, 17, 173/18

[56] References Cited

U.S. PATENT DOCUMENTS 1,126,096 1/1915 Schmidt ................................ 173/18

FOREIGN PATENT DOCUMENTS 531165 10/1921 France .................................. 173/18

921077 1/1947 France .................................. 173/16

1053893 10/1953 France .................................. 173/15

*Primary Examiner*—Lawrence J. Staab

*Attorney, Agent, or Firm*—McAulay, Fields, Fisher, Goldstein & Nissen

[57] ABSTRACT

An impact device comprises a cylindrical casing accommodating a hammer piston imparting blows to a working tool, which reciprocates under the action of compressed air admitted from a compressed air line through a control valve air distribution arrangement and a mechanism for automatically starting the device. The mechanism for automatically starting the device comprises a hollow two-step cylinder secured to the cylindrical casing accommodating a two-step piston which incorporates a valve co-operating with a tappet. The two-step piston is mounted in the hollow two-step cylinder in such a manner that an annular chamber is defined between the outer surface of the piston and the inner surface of the cylinder, the piston co-operating with the valve.

1 Claim, 1 Drawing Figure

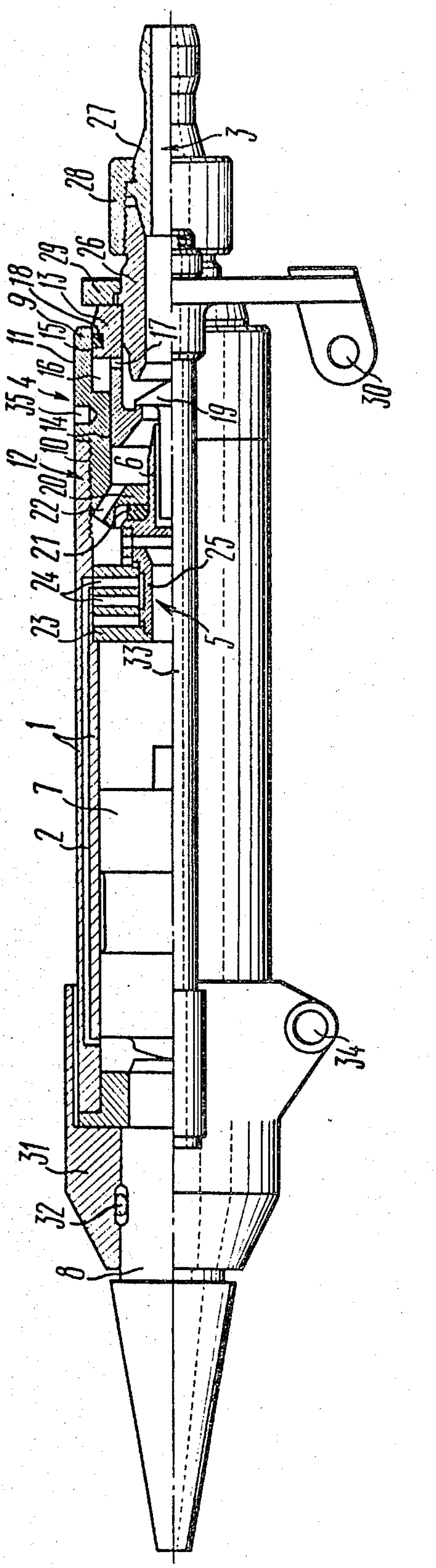
27
3
28
26
29
13
9,18
11
15
16
35
4
14
10
12
20
22
21
24
23
17
19
6
25
5
33
1
7
2
30
34
31
32
8

IMPACT DEVICE

FIELD OF THE INVENTION

The invention relates to impact devices.

The invention can be used in a removable working implement for all hydraulic excavators of the constructional type and may be advantageously employed for the destruction of rocks, frozen soils, concrete and asphalt pavements, old foundations for the equipment, buildings and constructions, for demolishing reinforced concrete structures. Furthermore, the invention may be advantageously used in working implements of a number of purpose-made machines, such as for crushing plates of ferromagnetic alloys, for demolishing open hearth furnace and convertor linings during repair operations, for driving shafts in the mining industry, in active-type excavator buckets for excavating cracked rocks and frozen soils without ripping.

BACKGROUND OF THE INVENTION

Known in the art are impact devices comprising a cylindrical casing accommodating a hammer piston imparting blows to a working tool, which reciprocates under the action of compressed air admitted through a control valve air distribution arrangement, a mechanism for automatically starting the device having a valve and a tappet co-operating with the valve and with the control valve air distribution arrangement (cf. USSR Inventor's Certificate No. 442298, Cl.E 21 c 3/24).

In the prior art devices, the mechanism for automatically starting the device, in addition to the valve, is provided with a valve casing and an adapter having longitudinal passages, rigidly connected to the cylindrical casing and co-operating with the valve. The adapter serves as the valve tappet.

The main disadvantage of the above-described impact device consists in that with any short-term load applied to the tool, the automatic starting arrangement puts the device on. Thus the entire blow energy is taken up by the device resulting in its intense wear and premature failure.

SUMMARY OF THE INVENTION

It is an object of the invention to provide an impact device having improved durability and reliability.

This and other objects are accomplished by that in an impact device comprising a cylindrical casing accommodating a hammer imparting blows to a working tool, which reciprocates under the action of compressed air admitted through a control valve air distribution arrangement, and a mechanism for automatically starting the device including a valve and a tappet co-operating with the valve and with the control valve air distribution arrangement, according to the invention, the mechanism for automatically starting the device additionally comprises a hollow two-step cylinder fastened to the cylindrical casing and a two-step piston mounted in the hollow cylinder in such a manner that an annular chamber is defined between the outer surface of the piston and the inner surface of the cylinder, the chamber communicating with a compressed air line, and the piston co-operating with the valve.

An annular collar co-operating with the tappet through a shock absorber and having ports for admitting compressed air to the control valve air distribution arrangement is preferably provided in the hollow two-step cylinder at the portion of the inner surface thereof directly adjacent the control valve air distribution arrangement.

This construction of the impact device according to the invention prevents its starting upon application of a short-term load to the working tool which would result in the device itself taking up the blow energy, so that the reliability and durability of the device are improved.

BRIEF DESCRIPTION OF THE DRAWING

The above and other objects of the invention will become apparent from reading the description of the specific embodiment thereof illustrated in the accompanying drawing which shows a general view partially in longitudinal section of the impact device according to the invention.

DETAILED DESCRIPTION OF THE INVENTION

The impact device according to the invention comprises a cylindrical casing 1 having passages 2 for compressed air. The casing 1 to which compressed air is admitted through a compressed air line 3 connected to a compressed air source (not shown for the sake of clarity), through a mechanism 4 for automatically starting the device and a control valve air distribution arrangement 5 co-operating with a tappet 6, accommodates a hammer piston 7 imparting blows to a working tool 8.

The mechanism 4 for automatically starting the device comprises a hollow two-step cylinder 9 having steps 10, 11 which is secured to the cylindrical casing 1 by means of a threaded coupling 12. For that purpose, a thread is provided at one end of the cylinder 9 on the outer surface of the step 10 to fit in a mating thread provided on the inner surface of the cylindrical casing 1. The cylinder 9 may be secured to the cylindrical casing 1 by any other known method.

The mechanism 4 is also provided with a two-step piston 13 having steps 14,15, which is mounted in the hollow cylinder 9 in such a manner that an annular chamber 16 is defined between the outer surface of the piston 13 and the inner surface of the cylinder 9, the annular chamber communicating with the compressed air line 3 through a port 17 of the piston 13. A sealing ring 18 is mounted between the cylinder 9 and the piston 13. The piston 13 incorporates a valve 19 which also constitutes a part of the mechanism for automatically starting the device, the valve co-operating, on the one hand, with the piston 13, and on the other hand, with the tappet 6.

An annular collar 20 is provided internally of the hollow two-step cylinder 9 at the portion of the inner surface of the step 10 directly adjacent the control valve air distribution arrangement 5, to co-operate with the tappet 6 through a shock absorber 21, the collar having ports 22 for admitting compressed air to the control valve air distribution mechanism 5 from the compressed air line 3.

The control valve air distribution mechanism 5 consists of a valve box 23 having openings 24 and a control valve 25.

The compressed air line 3 communicating with the compressed air source consists of two pipes 26,27 interconnected by means of a nut 28.

The pipe 26 supports a cross-piece 29 having a hole 30 for fastening to a manipulator of an excavator (not shown for the sake of clarity).

The working tool 8 is mounted for reciprocations in a guide sleeve 31 and is locked by means of a pin 32. The guide sleeve 31 is mounted in the cylindrical casing 1, connected to the cross-piece 29 by means of bars 33 and has a hole 34 for fastening to the manipulator of the excavator.

The hollow cylinder 9 has a hole 35 on the outer surface of the step 11 for threading the cylinder into the cylindrical casing 1.

The impact device according to the invention functions in the following manner.

The impact device is mounted with the working tool 8 at an object to be demolished and is pressed thereagainst through the guide sleeve 31. Upon application to the working tool 8 of a certain force exceeding the force developed by the pressure of compressed air in the chamber 16, the cylindrical casing 1, together with the control valve air distribution arrangement 5, two-step cylinder 9 and tappet 6, moves relative to the piston 13 until the two-step cylinder 9 bears against the cross-piece 29. During the movement, the tappet 6 acts on the valve 19 which opens the path for the passage of compressed air from the compressed air line 3 to the control valve air distribution arrangement 5, via the ports 22 of the annular collar 20. Thus, the hammer piston 7 starts reciprocating to impact blows to the working tool 8. After the object has been demolished, or after the pressure force developed by compressed air in the chamber 16 has been removed, the two-step cylinder 9, together with the tappet 6, control valve air distribution mechanism 5 and the cylindrical casing 1, moved relative to the piston 13, the valve 19 shuts off the path for compressed air admission to the control valve air distribution arrangement 5, and the device is put off.

The impact device according to the invention is simple in structure, failure proof in operation, sufficiently reliable and durable and may be suspended to any hydraulic excavator of the constructional type. Moreover, the device according to the invention may be used with any other purpose-made manipulator.

What is claimed is:

1. An impact device comprising:

a cylindrical casing having a first end and a second end;

a compressed air line for air admission to the said cylindrical casing at the first end thereof;

a mechanism for automatically starting said device mounted to said cylindrical casing on the side of the first end thereof, compressed air being admitted to said cylindrical casing through said mechanism, said mechanism for automatically starting said device comprising a hollow two-step cylinder having a first end, a second end, an outer surface and an inner surface and secured with the first end thereof to the first end of said cylindrical casing, a two-step piston having an outer surface and an inner surface and mounted in said hollow cylinder in such a manner that an annular chamber is defined between said outer surface of said piston and said inner surface of said cylinder, the chamber communicating with said compressed air line, and a valve mounted in said piston and co-operating with said piston to cut-off compressed air supply to said cylindrical casing from said compressed air line;

a tappet mounted in said cylindrical casing downstream said valve in the path of flow of said compressed air to co-operate with said valve;

a control valve air distribution arrangement mounted in said cylindrical casing downstream said mechanism for automatically starting said device in the path of flow of said compressed air to co-operate with said tappet and said mechanism for automatically starting said device to distribute compressed air to said cylindrical casing;

a hammer piston mounted for reciprocations in said cylindrical casing under the action of compressed air admitted through said control valve air distribution arrangement;

a working tool mounted in said cylindrical casing, said hammer piston acting on said working tool by imparting blows thereto; and an annular collar disposed internally of said hollow two-step cylinder at a portion of said inner surface directly adjacent said control valve air distribution arrangement; said device being further defined by a shock absorber mounted between said annular collar and said tappet, through which said annular collar co-operates with said tappet; and a plurality of ports for admission of said compressed air to said control valve air distribution arrangement provided in said annular collar.

* * * * *